United States Patent [19]
Schulte

[11] Patent Number: 6,148,757
[45] Date of Patent: Nov. 21, 2000

[54] HYDRODYNAMIC AND REINFORCED CATAMARAN HULL DESIGN

[76] Inventor: Mark Schulte, 2171 106th La. NE., Blaine, Minn. 55449

[21] Appl. No.: 09/028,795

[22] Filed: Feb. 24, 1998

[51] Int. Cl.⁷ .................................................. B63B 1/32
[52] U.S. Cl. ........................... 114/288; 114/290; 114/61.2
[58] Field of Search ................... 114/61.1, 61.15, 114/61.16, 61.2, 61.22, 62, 288–290; D12/304

[56] References Cited

U.S. PATENT DOCUMENTS

| | | | |
|---|---|---|---|
| 3,791,329 | 2/1974 | Bruning | 114/62 |
| 3,937,164 | 2/1976 | Austin | 114/61 |
| 4,000,712 | 1/1977 | Erikson et al. | 114/77 R |
| 4,015,555 | 4/1977 | Tinkham | 115/1 C |
| 4,215,756 | 8/1980 | Hunt | 180/127 |
| 4,392,445 | 7/1983 | Burg | 114/67 A |
| 4,407,215 | 10/1983 | Cyr | 114/289 |
| 4,478,166 | 10/1984 | Sorensen | 114/290 |
| 4,649,851 | 3/1987 | April | 114/271 |
| 4,661,075 | 4/1987 | Czerniak | 440/69 |
| 4,708,077 | 11/1987 | Balquet et al. | 114/67 A |
| 4,760,810 | 8/1988 | Kobayashi | 114/56 |
| 4,762,080 | 8/1988 | Pearson | 114/343 |
| 4,951,591 | 8/1990 | Coles | 114/274 |
| 4,989,534 | 2/1991 | Field | 114/289 |
| 4,998,898 | 3/1991 | Dufrene | 440/37 |
| 5,199,373 | 4/1993 | Mardikian | 114/288 |
| 5,456,201 | 10/1995 | Bobst | 114/289 |

*Primary Examiner*—Ed Swinehart
*Attorney, Agent, or Firm*—Nawrocki, Rooney & Sivertson, P.A.

[57] ABSTRACT

An air propelled boat. It is provided with a pair of catamaran hulls, each having a unique catamaran hull design particularly adaptable for travel over land, water, ice or snow. Each catamaran hull has a pair of centered concave flutes extending from the aft end of the body to the forward end of the nose. At the nose end, the flutes are reduced in concavity and inclined longitudinally and laterally. Both inclinations are reduced in slope forward. The flutes guide water outward and under the hull and move the water hull contact aft. This decreases hull drag and increases lift. The hull bottoms are formed into a central longitudinal support flat which is flanked by parallel outboard support flats. The undersurface of a catamaran hull is covered by an ultra-high molecular weight plastic profile to reduce friction when traveling over a solid supporting surface. The catamaran hulls are foam filled for rigidity.

6 Claims, 3 Drawing Sheets

HYDRODYNAMIC AND REINFORCED CATAMARAN HULL DESIGN

BACKGROUND OF THE INVENTION

1. Field of the Invention

This apparatus provides a hydrodynamic and reinforced hull design and hydrodynamic assist for catamarans which particularly adapt the boat for movement over land, water, ice and snow and for efficient planing.

2. Description of the Prior Art

Shaping the hull of a boat to provide enhanced performance is known in the art. Cyr, U.S. Pat. No. 4,407,215, teaches a hull having an essentially flat bottom main section which has an open bottom air tunnel which permits air flow therethrough.

Czerniak, U.S. Pat. No. 4,661,075, has a channel extending longitudinally approximately one-third the length of the vessel on the underside of the hull which contains propellers. Balquet et al., U.S. Pat. No. 4,708,077, has two shaped keels connected by a center platform with two sealing devices which provide a supporting air cushion.

Kobayashi, U.S. Pat. No. 4,760,810, has a hull with a generally flat undersurface which have a pair of concave sections formed transversely outwardly of the flat undersurface to improve stability in straight ahead running without increasing the resistance to forward movement. Coles, U.S. Pat. No. 4,951,591, modifies a boat hull by at least one axial tunnel intermediate the bow and transom to enhance lift and rough water stability.

In Mardikian, U.S. Pat. No. 5,199,373, a jet ski hull has oppositely disposed symmetrical concave curvilinear fluted walls which form the bow portion of the lower hull section, and an elongated outer fluted groove within the walls arranged to cause the water to spin at a high velocity and generate a suction action between the bottom surface of the hull and the water.

The prior art does not teach shaping a hull to direct water and turbulence aft and under the hull to be discharged aft of the hull to decrease drag and increase lift. In addition, no hull shaping or use of additional material to provide additional strength and decrease friction and decrease heat resulting from friction when traveling over a solid terrain is taught. The use of an additional hull between the catamaran hulls to assist in planning is also not taught.

SUMMARY OF THE INVENTION

This invention relates to improvements to a propeller driven catamaran boat with multiple boat hulls. The boat hulls are of a unique design arranged to make the boat particularly adapted for moving over surfaces consisting of land, water, ice or snow. Laterally-spaced twin hulls have bottoms shaped to divert water hydrodynamically to the sides and under each hull to be discharged at the rear, and have sides inclined to divert material under the hull. These modifications to hull shape reduce drag and also increase lift. The inclined sides also reduce resistance to turns.

A pair of concave flutes are formed in the bottom of each hull, each flute extending generally from the stern to the bow on opposite sides of the centerline. These concave flutes are substantially parallel to the centerline.

The hull has a body terminating in a forward nose. The portion of a flute which extends to the nose decreases in concavity from the aft end to the forward end of the nose. The flutes in the nose also have lateral and longitudinal inclinations. The lateral inclinations incline upward from the hull centerline outward, and the longitudinal inclinations incline upward from the aft end of the nose forward. Both inclinations decrease in slope from the aft end of the nose forward. Sides of a hull are also inclined upward from the centerline outward.

The concave flutes in the body, the reduced concavity and inclined flutes in the nose, and the inclined sides cooperate to efficiently and hydrodynamically guide water and turbulence rearward along and under the hull to be discharged at the aft end of the boat. The performance of the boat is greatly enhanced by this arrangement since hull drag is reduced and lift is increased.

Prior art designs used a hull nose design which was both blunt and long. A blunt nose does not divert water in an efficient hydrodynamic manner, and a nose which is too long tends to cause the hull to teeter and bounce. This increases the drag on the hull. The present invention has a generally streamlined shaped bow to avoid these problems.

Three support flats, generally parallel to the hull centerline, are formed in the hull body. These flats strengthen the hull for traveling over a solid surface, whether ground, ice or snow. A center flat extends along the hull centerline. Two outboard flats are positioned parallel to the center flat and are offset on opposite sides of the centerline immediately outboard of the flutes. These flats protect the hull when moving over any solid Surface.

A solid lubricant of ultra-high molecular weight plastic, such as TY-VAR 88®, is molded to conform to the hull and is affixed to the bottom of the hull in the form of a unitary profile. The length of the profile is different in different versions of the present invention, depending upon hull length and desired length of coverage. This solid lubricant adds impact resistance and decreases hull drag when moving over a solid surface. FIGS. 2 and 3 illustrate an embodiment wherein the TY-VAR 88® profile extends substantially the full length of the catamaran hulls. FIG. 5 illustrates an alternative embodiment wherein the forward edge of the profile is at a location at a distance rearward of the forward end of the hull. In this embodiment, however, the profile extends sufficiently forward so that it will still obtain the benefits intended.

TY-VAR 88® is a particular material which serves to provide the hulls with a number of distinct advantages. First, it affords impact protection. Further, however, it affords freeze protection and lubricity. These are particularly desirable characteristics when the vehicle is being used on snow or ice. Even further, however, a profile manufactured from such a material affords ultraviolet protection and antistatic attributes. It will be understood, however, that while TY-VAR 88® is one particularly desirable material for this purpose, there are other alternative materials which could suffice to provide the advantages discussed hereinbefore.

The hull also has lateral outer slopes extending longitudinally along both outer edges extending upward and outward from the outer edges of the outboard flats. These lateral outer slopes provide additional buoyancy and increased planing lift by also directing water outwardly and downwardly from the boat to further reduce drag and increase lift. These outer slopes also facilitate turning by lifting the rear of the hull higher as the rear of the boat is pushed sideways in a turn. In a turn the material of the underlying terrain other than a solid, whether water, snow or ice, is pushed against the rear of the hull, but since the hull is higher in a turn because of these slopes the material is forced under the hull rather than against it. Whereas previously material being forced against the rear of the boat impeded the turn, with the material now moving under the hull the turn is unimpeded.

The hulls, in a preferred embodiment, are foam-filled to ensure positive buoyancy even if breached, to provide additional impact resistance, and to provide structural integrity.

A plastic film is "stretched" to fit over and cover the central hull, discussed hereinafter, and it will increase lubricity to minimize heat due to friction when traversing over a solid surface.

The catamaran hulls are connected by a deck frame structure which also supports conventional air propulsion and vane steering apparatus. The spacing between hulls, established by the deck frame structure, is arranged to optimize lift and reduce drag. Hulls are constructed in accordance with the present invention have minimum water resistance when planing, with the deck generally parallel to the water surface.

One embodiment of the present invention envisions a central supplemental hull, between the two catamaran hulls, which is shaped and located to contact the water during planing to increase lift and reduce drag during this maneuver. This hull also enhances stability by its interaction with water which would otherwise tend to well up between the two outboard hulls under certain conditions. Since this central hull is positioned to contact the water during the planing maneuver, it imposes no drag penalty after the catamaran hulls have reached planing speed and attitude.

The central hull also serves a function when the vehicle is traveling over soft, compressible snow and ice. As the vehicle travels over such material, the snow and/or ice will become compressed, and the catamaran hulls will sink down into the material. This will bring the central hull into engagement with the soft, compressible snow and/or ice, and increased lift will result.

BRIEF DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

Figure 1:
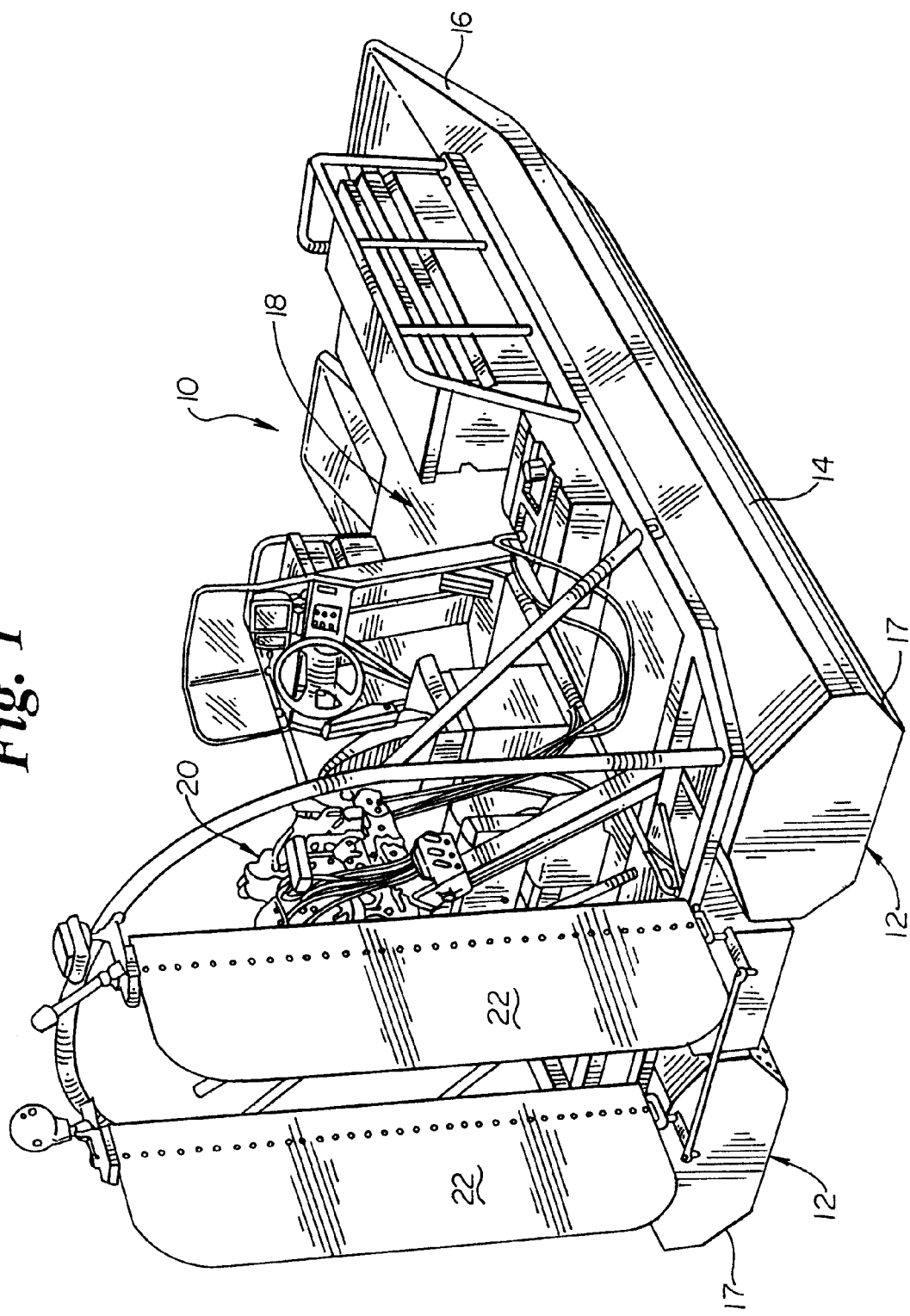
FIG. 1 is a perspective view of the invention in use as catamaran hulls for a propeller driven all terrain vehicle used in a variety of environments.

A catamaran boat 10, shown in FIG. 1, has a twin pair of catamaran hulls 12. Each catamaran hull 12 has a main body portion 14 and a shaped nose 16. A deck structure 18 connects catamaran hulls 12 together and provides support for an engine for driving a propeller, and coupled air rudders 22. The deck structure 18, engine 20 and coupled air rudders 22 are known in the art.

FIGS. 1–5 show different constructions of the catamaran hulls 12, attachment of the hulls to the deck structure 18 and attachments to the hulls themselves. Bolts 24 extending through holes in deck structure 18, shown in dashed outline, into mating threaded holes in catamaran hulls 12 secure the parts together using mating nuts.

Concave flutes 26 extend along the full length of catamaran hulls 12 with the flutes in nose 16 being reduced in concavity from the aft end of the nose forward. Flutes 26 are also inclined longitudinally upward and inclined laterally outward in nose 16 with the inclinations both being reduced from the aft to the forward end of the nose. The outer edges 17 of hulls 12 are inclined upward along the longitudinal portion of the hulls from the centerline outward.

Center support flat 30 is formed along the centerline of hull 12, and outboard support flats 31 are formed along the outboard edges of flutes 26 parallel to the hull centerline. Flats 30 and 31 provide additional hull strength when traveling over a solid terrain.

In one embodiment, ultra-high molecular weight plastic profile 32 is shown attached over the hull lower surface. This affords lubricity to the hull. It has been found that TY-VAR 88® is particularly applicable for this purpose. It can provide ultraviolet protection and an antistatic characteristic. Probably more significantly, however, it also affords impact protection to the catamaran hulls and also provides lubricity and freeze protection.

Figure 3:
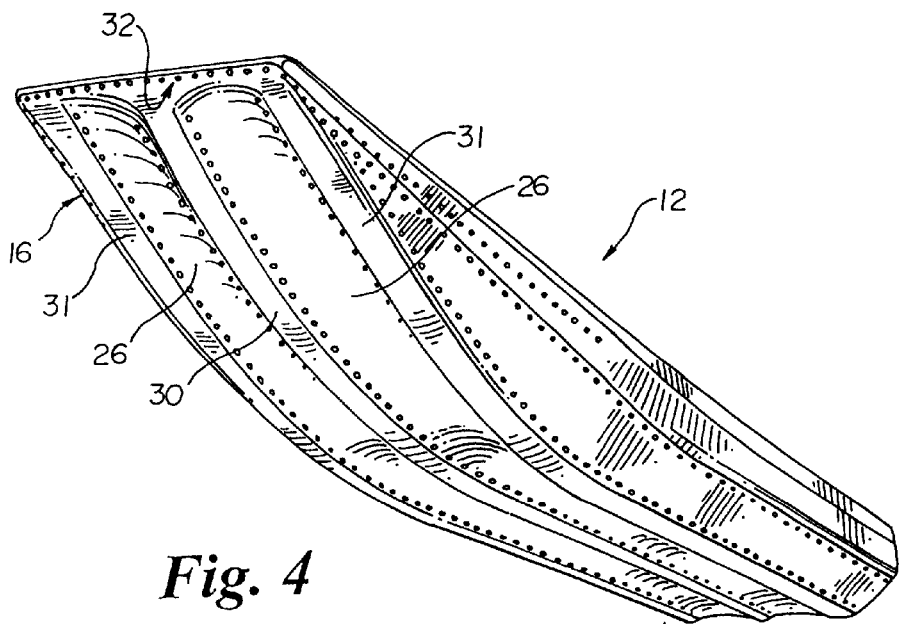
FIG. 3 is a perspective view showing the bottom of a catamaran hull from below, forward and slightly to port.
Figure 4:
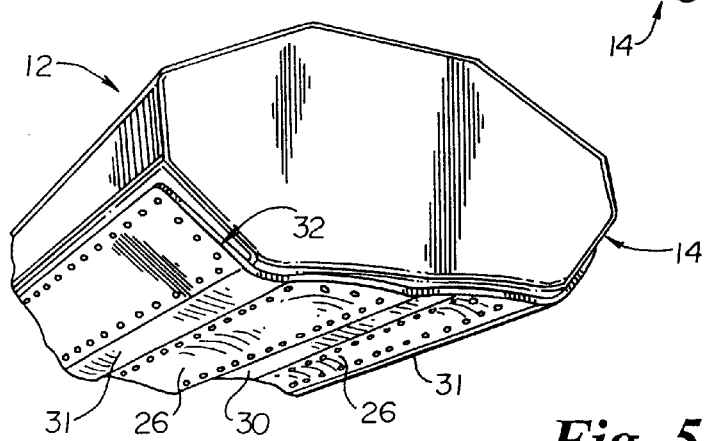
FIG. 4 is a fragmentary perspective view of a catamaran hull showing the stern from below, aft and slightly to port.

In FIG. 3 ultra-high molecular weight plastic profile 32 is shown attached over the lower surface of hull 12, extending to a forward edge thereof, with outer edges of the profile extending upwardly along each side of the hull 12. The ultra-high molecular weight profile 32 is secured to the bottom of the catamaran hulls 12 by appropriate means. Theoretically, any means might suffice. It has been found, however, that glues, epoxies, etc., are not sufficient to maintain the profile 32 attached to the respective hull 12 when subjected to significant impacts as will occur with the vehicle. It is intended, therefore, that rivets be used to secure the profile 32 to the hull 12. With reference to FIG. 3, particularly, it will be noted that the rivets are not shown as being passed through the profile 32 along flat portions on the underside of the hull 12. Rather, they are passed through the profile 32 and the backing surface of hull 12 within flutes 26. Consequently, when the vehicle is traveling over terrain which imparts significant stress, impact, and abrasion to the undersurface of the vehicle, the rivets will be substantially unaffected. That is, the brunt of impact and abrasion will be brought to bear upon the portion of profile 32 overlying support flats 31.

Figure 5:
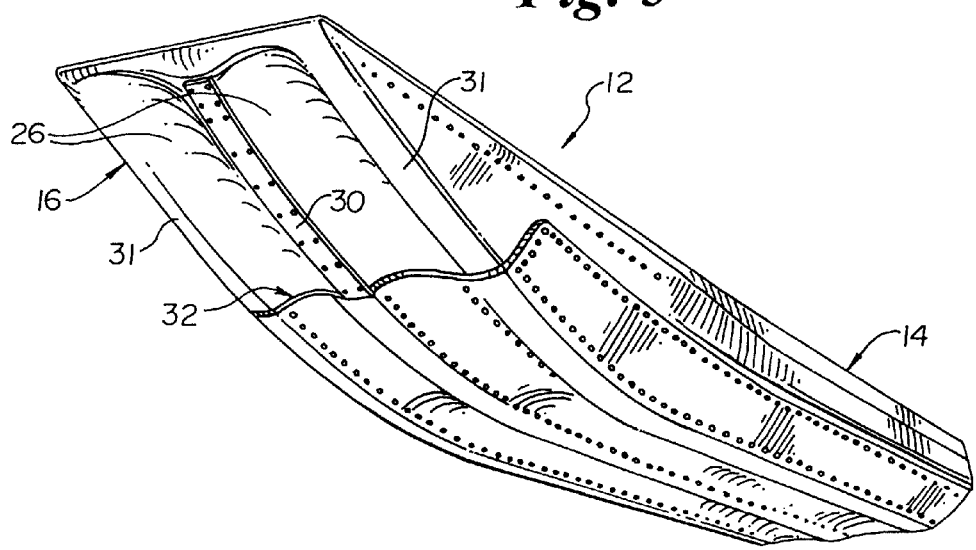
FIG. 5 is a view similar to that of FIG. 3 showing an alternate version of an attached flat.

FIG. 5 shows an embodiment wherein ultra-high molecular weight plastic profile terminates at a location forwardly on the hull at a location rearward of the bow. In this embodiment also, means for optimizing the wear characteristics of the hull over a solid surface are provided.

Outer transverse slopes 40, which incline upward from the centerline outward, are formed in catamaran hulls 12 outboard of the outer flats. Slopes 40 serve to deflect material under the catamaran hull in a turn to minimize turn resistance.

Figure 2:
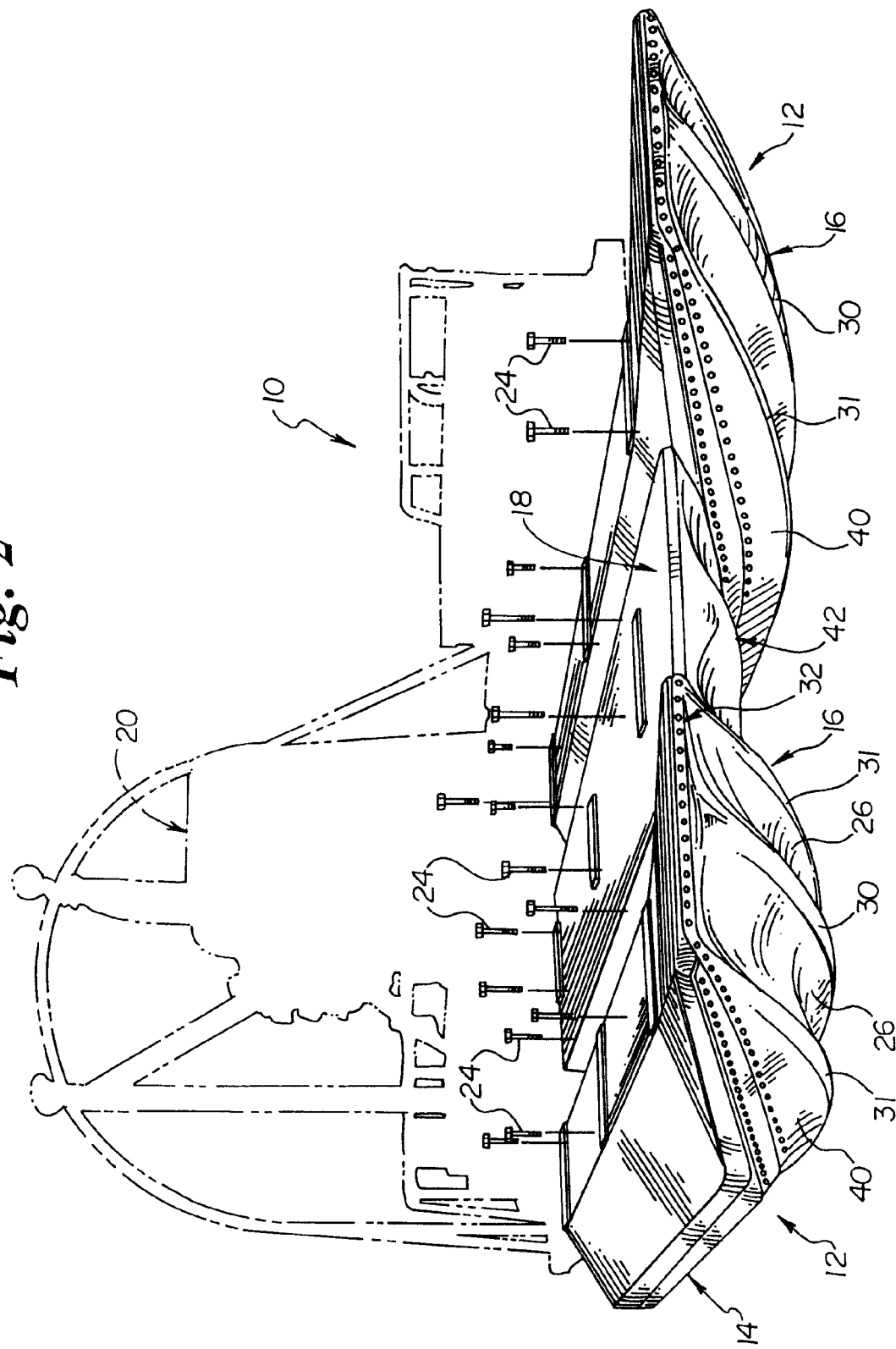
FIG. 2 is a perspective view of the catamaran hulls shown side by side as used in the assembly of FIG. 1.

As best seen in FIG. 2, central hull 42 is shown between and parallel to catamaran hulls 42. Central hull 42 is also attached to deck structure 18 by bolts 24 the same as hulls 12, and hull 42 lies in a plane above that of catamaran hulls 12. That is, central hull 42 does not extend downward as far as catamaran hulls 12 and is only in contact with the water, when traveling over water, prior to and during a planing maneuver.

During the planing maneuver water is forced between catamaran hulls 12 and flows upward into deck structure 18.

This produces additional drag which extends the planing maneuver and consumes additional fuel. Central hull 42 intercepts this upwelling water and converts its force to an additional lift on boat 10. This accelerates the planing maneuver by converting what previously was an additional drag to additional lift. The drag of the upwelling water on central hull 42 is less because the shape of hull 42 is smoother than deck structure 18. The addition of supplemental hull 42, while not involved in the operation of boat 10 after planing, enhances the planing maneuver itself and reduces fuel consumption during this maneuver.

As previously discussed, central hull 42 also serves a function when the vehicle is moving over soft, generally compressible material such as snow and ice. As the weight of the vehicle is brought to bear upon the compressible material, the vehicle will sink into the material. This will occur until central hull 42 engages the material. Once this occurs, contact of the central hull with the ice and/or snow will, in view of the construction of central hull 42, effect lift. Consequently, the vehicle will perform more optimally.

Catamaran hulls 12 and central hull 42 can be foam filled to increase hull rigidity and ensure positive flotation whenever a hull is punctured. The lower portions of central hull 42 can be covered with a plastic film, as hulls 12 are covered by a plastic profile. The plastic film can have an adhesive backing and will stretch with the application of heat after application. The film is applied to the hull 42 and heated to stretch the film to closely fit the hull's shape. This plastic film will reduce friction and minimize heating when traversing solid terrain. A number of commercially available plastic films have the required characteristics.

The hull modifications of catamaran hulls 12 greatly enhance the performance of the boat in water by decreasing the drag and increasing the lift. These catamaran hull modifications and additions also greatly enhance the performance of the boat over land, snow or ice by reducing friction, and increasing strength against impact imposed on the boat when traveling over a solid surface. The addition of a central hull greatly enhances the planing maneuver both by reducing drag and by increasing lift, and also increases the boat stability.

While this invention has been described with reference to illustrative embodiments, these descriptions are not intended to be construed in a limiting sense. Various modifications of the illustrative embodiments, as well as other embodiments of the invention, will be apparent to persons skilled in the art upon reference to these descriptions. It is therefore contemplated that the appended claims will cover any such modifications or embodiments as fall within the true scope of the invention.

What is claimed is:

1. An improvement to a vehicle including a pair of catamaran hulls with each catamaran hull having a body terminating in a forward nose, the vehicle including a deck structure, the improvement wherein each catamaran hull has at least two concave flutes formed therein which extend longitudinally from the stern to the bow, said flutes being generally parallel to the hull centerline, and said each catamaran hull has formed therein a central longitudinal support flat and at least two outboard longitudinal support flats, said outboard flats bracketing said flutes and parallel to the centered support flat, said flats extending generally from the stern to the bow.

2. The improvement of claim 1 further comprising an ultra-high molecular weight plastic profile overlying and affixed to a bottom surface of said catamaran hull.

3. The improvement of claim 2 wherein the outer catamaran hull edges have a lateral upward inclination outwardly from the outside edge of outboard flats.

4. The improvement of claim 3 further comprising a central hull having a plastic heat-stretchable, adhesive-backed film attached to the central hull.

5. The improvement of claim 2 wherein said plastic profile terminates at a predetermined distance from the bow of said catamaran hulls.

6. The improvement of claim 1 further comprising a central hull attached to a deck structure to which said catamaran hulls are attached, said central hull being mounted between and parallel to said catamaran hulls, said central hull extending downward from the deck structure a smaller distance than said catamaran hulls.

* * * * *